(12) United States Patent
Vankayala et al.

(10) Patent No.: US 12,557,076 B2
(45) Date of Patent: Feb. 17, 2026

(54) METHOD AND SYSTEM FOR BANDWIDTH MANAGEMENT IN WIRELESS COMMUNICATION NETWORK

(71) Applicant: Samsung Electronics Co., Ltd., Suwon-si (KR)

(72) Inventors: Satya Kumar Vankayala, Bangalore (IN); Ashvin Kaithara Joseph, Bangalore (IN); Seungil Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 445 days.

(21) Appl. No.: 17/832,131

(22) Filed: Jun. 3, 2022

(65) Prior Publication Data
US 2022/0394694 A1 Dec. 8, 2022

Related U.S. Application Data

(63) Continuation of application No. PCT/KR2022/007736, filed on May 31, 2022.

(30) Foreign Application Priority Data

Jun. 4, 2021 (IN) .............................. 202141025030
May 24, 2022 (IN) ............................. 202141025030

(51) Int. Cl.
*H04W 72/044* (2023.01)
*H04L 27/26* (2006.01)
(Continued)

(52) U.S. Cl.
CPC ..... *H04W 72/044* (2013.01); *H04L 27/26025* (2021.01); *H04W 28/0268* (2013.01); *H04W 72/20* (2023.01)

(58) Field of Classification Search
CPC .......... H04W 72/044; H04W 28/0268; H04W 72/20; H04W 72/0453; H04L 27/26025;
(Continued)

(56) References Cited

U.S. PATENT DOCUMENTS 11,483,845 B2 * 10/2022 Gordaychik .......... H04W 72/23
2018/0007580 A1 * 1/2018 Kang ................ H04W 28/0263
(Continued)

FOREIGN PATENT DOCUMENTS

CN 110447175 11/2019
CN 110475297 11/2019
(Continued)

OTHER PUBLICATIONS

Search Report and Written Opinion dated Oct. 26, 2022 issued in International Patent Application No. PCT/KR2022/007736.
(Continued)

*Primary Examiner* — Nicholas R Taylor
*Assistant Examiner* — Angela Widhalm De Rodriguez
(74) *Attorney, Agent, or Firm* — NIXON & VANDERHYE P.C.

(57) ABSTRACT

Various embodiments herein provide a method for resource allocation, by a server, in multiple Band Width Part (BWP) system. The method includes: receiving a plurality of data packets from a network device for transmission to a UE. Further, the method includes determining a plurality of network parameters associated with the network device, the UE, and the plurality of received data packets. Further, the method includes grouping the plurality of received data packets based on the plurality of network parameters. Further, the method includes allocating a BWP and/or sub-carrier spacing to each grouped data packets based on the plurality of network parameters. Further, the method
(Continued)

includes sending the plurality of group data packets using the allocated BWP and/or the allocated subcarrier spacing.

18 Claims, 9 Drawing Sheets

(51) Int. Cl.
*H04W 28/02* (2009.01)
*H04W 72/20* (2023.01)

(58) Field of Classification Search
CPC ... H04L 1/0083; H04L 5/0007; H04L 1/0003; H04L 1/0009; H04L 1/0015; H04L 5/0044; H04L 5/006; H04L 5/0005; H04L 5/0094

See application file for complete search history.

(56) References Cited

U.S. PATENT DOCUMENTS

| | | |
|---|---|---|
| 2018/0183551 A1 | 6/2018 | Chou et al. |
| 2019/0357215 A1 | 11/2019 | Zhou et al. |
| 2019/0357260 A1 | 11/2019 | Cirik et al. |
| 2020/0170022 A1 | 5/2020 | Jones |
| 2021/0029691 A1* | 1/2021 | Bassirat ................. H04W 72/51 |
| 2021/0111856 A1 | 4/2021 | Zhou et al. |
| 2021/0167934 A1 | 6/2021 | Fan et al. |
| 2021/0321398 A1* | 10/2021 | Kwon ................... H04L 5/0044 |
| 2021/0329487 A1 | 10/2021 | Wang et al. |
| 2022/0345282 A1* | 10/2022 | Back ..................... H04W 72/04 |

FOREIGN PATENT DOCUMENTS

| | | | | |
|---|---|---|---|---|
| CN | 111615212 | 9/2020 | | |
| KR | 10-2021-0042963 A | 4/2021 | | |
| WO | WO-2021020903 A1 * | 2/2021 | ........... | H04L 5/0094 |
| WO | 2021/101315 | 5/2021 | | |
| WO | WO-2021101315 A1 * | 5/2021 | ........... | G06F 18/214 |

OTHER PUBLICATIONS

Indian Office Action issued Mar. 9, 2023 in corresponding Indian Patent Application No. 202141025030.
Partial Supplementary European Search Report dated Sep. 16, 2024 for EP Application No. 22816434.9.
Shu Sun et al.; XP081822973, Deep-Reinforcement-Learning-Based Scheduling with Contiguous Resource Allocation for Next-Generation Cellular Systems, 14 pgs.
Extended European Search Report dated Dec. 10, 2024 for EP Application No. 22816434.9.

* cited by examiner

METHOD AND SYSTEM FOR BANDWIDTH MANAGEMENT IN WIRELESS COMMUNICATION NETWORK

CROSS REFERENCE TO RELATED APPLICATIONS

This application is a continuation of International Application No. PCT/KR2022/007736 designating the United States, filed on May 31, 2022, in the Korean Intellectual Property Receiving Office and claiming priority to Indian Provisional Patent Application Serial No. 202141025030 (PS), filed on Jun. 4, 2021, in the Indian Intellectual Property Office, and to Indian Complete Patent Application Serial No. 202141025030 (CS), filed on May 24, 2022, in the Indian Intellectual Property Office, the disclosures of all of which are incorporated by reference herein in their entireties.

BACKGROUND

Field

The disclosure relates to a wireless communication network, and for example, is related to a method and a system for bandwidth management in the wireless communication network.

Description of Related Art

A Bandwidth Part (BWP) is a contiguous set of Physical Resource Blocks (PRBs) on a given carrier. The PRBs are selected from a contiguous subset of common resource blocks for a given numerology ($\mu$) (e.g., $\mu$=0, 1, 2, 3, 4, etc.). Each BWP defined for the numerology can have three different parameters. For example, subcarrier spacing, symbol duration, and Cyclic prefix (CP) length. User Equipment (s) (UEs) can be configured with up to four BWPs for a downlink and an uplink. But only one BWP could be operational at any given time for the downlink and the uplink. The concept of the BWP enables the UEs to operate in a narrow bandwidth and when the UEs demand more data (bursty traffic) then the UEs can inform a server (e.g. gNodeB (gNB), Virtualized radio access network (vRAN), Open Radio Access Network (O-RAN), Centralized Radio Access Network (C-RAN)) to enable wider bandwidth. The server configures the BWP with parameters such as the BWP numerology ($\mu$), a BWP bandwidth size, a frequency location (e.g., New Radio Absolute Radio-Frequency Channel Number (NR-ARFCN), a Control Resource Set (CORESET).

With rapid evolution of services (e.g., UE-related services) provided by network operators to the UEs, it is necessary to assign more than one BWP to each UE. With severe data and latency requirements, it is necessary to adapt to a diverse range of Quality of Service (QoS) for various services. The server must allocate a distinct BWP for each service. However, there are some limitations/drawbacks associated with BWP allocation in conventional networks, such as the conventional network allocating the UE(s) with just one active BWP when an RRC connection is sent during an attach procedure. Another drawback is that the UE(s) cannot request recommended BWP to the server in the conventional network. Yet, another drawback is that the conventional network schedules all QoS in the same BWP, activates only one BWP, and schedules data only in the one activated BWP. Yet, another drawback is that there is no integration between the BWP and Modulation and Coding Scheme (MCS) to deliver optimal service(s) to users of the UEs. The MCS defines numbers of useful bits which can be carried by one symbol. In contrast with 5th Generation (5G) wireless communication network or 4G wireless communication network, a symbol is defined as Resource Element (RE) and MCS is defined as how many useful bits can be transmitted per Resource Element (RE). Yet, another drawback is that the existing 3rd Generation Partnership Project (3GPP) standard allows one MCS/BWP/Transmission Time Interval (TTI) for all QoS.

Thus, it is desired to address the above-mentioned disadvantages or other shortcomings or at least provide a useful alternative for bandwidth management in the wireless communication network.

SUMMARY

Embodiments of the disclosure provide a method for dynamically switching between active Bandwidth Part(s) (BWPs) and/or Modulation Coding Scheme(s) (MCSs) to transmit multiple Quality of Service (QoS) data/groups based on a plurality of parameters (e.g. load conditions of a User Equipment (UE), throughput requirement of the UE, active profile of the UE, etc.) using Machine Learning (ML)/Artificial Intelligence (AI) mechanism. The multiple QoS data/groups are transmitted simultaneously/periodically/non-periodically to the UE using a MAC control element and/or RRC message and/or physical downlink channel and/or broadcast message and/or control message. As a result, the UE's QoS will increase and enhance user experience, throughput, and latency.

Embodiments of the disclosure may allocate multiple active BWPs to transmit multiple QoS data/groups based on the plurality of parameters using the ML/AI mechanism. The multiple QoS data/groups are transmitted simultaneously/periodically/non-periodically to the UE using the MAC control element and/or RRC message and/or physical downlink channel and/or broadcast message and/or control message. As a result, the UE's QoS will increase and enhance user experience, throughput, and latency.

Embodiments of the disclosure may dynamically change active BWPs sub-carrier spacing to transmit multiple QoS data/groups based on the plurality of parameters using the ML/AI mechanism. The multiple QoS data/groups are transmitted simultaneously/periodically/non-periodically to the UE using the MAC control element and/or RRC message and/or physical downlink channel and/or broadcast message and/or control message. As a result, the UE's QoS will increase and enhance user experience, throughput, and latency.

Embodiments of the disclosure may send a recommended BWPs request, by the UE, to a server (e.g., network, cloud network, etc.) for uplink data transmission through the MAC control element based on the plurality of parameters (e.g. UE related parameters) and the server activates/deactivates BWPs per time slot for the UE.

Accordingly, according to an example embodiment a method for bandwidth management by a server in a wireless communication network is provided. The method includes: receiving a plurality of data packets from a network device (e.g., base station) for transmission to a user equipment (UE); determining a plurality of network parameters associated with at least one of the network device, the UE, and the plurality of received data packets; grouping the plurality of received data packets based on the plurality of network parameters; allocating a bandwidth part (BWP) and/or a sub-carrier spacing to each grouped data packets based on the plurality of network parameters; and sending the plurality of group data packets using the allocated BWP and/or the allocated subcarrier spacing.

In an example embodiment, sending, by the server, the plurality of group data packets using the allocated BWP and/or the allocated subcarrier spacing includes: scheduling, by the server, a transmission of grouped data packets over the allocated BWP and/or the allocated subcarrier spacing, dynamically switching, by the server, the allocated BWP and/or the allocated subcarrier spacing based on the plurality of network parameters, and sending, by the server, the scheduled data packets to the UE.

In an example embodiment, the plurality of network parameters includes: Quality of Service (QoS) parameters of the plurality of received data packets, a status of a base station, a total available bandwidth at the base station, a require load condition of the UE, a user-specific input, an active profile of the UE, a service type, a requirement of Block Error Rate (BLER), a packet loss tolerance, a UE category, a QoS Class Identifier (QCI) load status, a coherence time, and a coherence bandwidth.

In an example embodiment, grouping, by the server, the plurality of received data packets based on the plurality of network parameters includes: receiving, by the server, the plurality of network parameters, generating, by the server, an Artificial intelligence (AI) model using the plurality of network parameters and a time, wherein the AI model is trained using a Reinforcement Learning, and grouping, by the server, the plurality of received data packets using the AI model.

In an example embodiment, dynamically switching, by the server, the allocated BWP based on the plurality of network parameters to send the scheduled data packets to the UE includes: sending, by the server, the scheduled data packets to the UE using a first active BWP of the BWP, detecting, by the server, a change in the plurality of network parameters, wherein the server requires a second active BWP of the BWP to send the scheduled data packets to the UE, sending, by the server, active BWP change information to the UE, dynamically switching, by the server, from the first active BWP to the second active BWP upon sending the active BWP change information to send the scheduled data packets to the UE.

In an example embodiment, the active BWP change information is sent using a Medium Access Control (MAC) element, a Radio Resource Control (RRC) signalling, a physical downlink channel, a broadcast message and a control message, and wherein the active BWP change information is sent to the UE using a periodic transmission and/or aperiodic transmission.

In an example embodiment, dynamically switching, by the server, the allocated BWP based on the plurality of network parameters to send the scheduled data packets to the UE includes: sending, by the server, the scheduled data packets to the UE using the first active BWP of the BWP, detecting, by the server, a change in the plurality of network parameters, wherein the server requires the second active BWP of the BWP to send the scheduled data packets to the UE, sending, by the server, additional BWP change information to the UE, simultaneously sending, by the server, the scheduled data packets to the UE using the first active BWP and the second active BWP, detecting, by the server, a change in the plurality of network parameters, wherein the server requires the first active BWP of the BWP to send the scheduled data packets to the UE, sending, by the server, deactivation of the BWP change information to the UE, dynamically switching, by the server, to the first active BWP upon sending the deactivation of the BWP change information to send the scheduled data packets to the UE.

In an example embodiment, the additional BWP change information and deactivation of the BWP change information utilize the MAC element, the RRC signalling, the physical downlink channel, the broadcast message and the control message, and wherein the active BWP change information is sent to the UE using the periodic transmission and/or the aperiodic transmission.

In an example embodiment, dynamically switching, by the server, the allocated subcarrier spacing based on the plurality of network parameters to send the scheduled data packets to the UE includes: sending, by the server, the scheduled data packets to the UE using the first active BWP of the BWP with a first sub-carrier spacing, detecting, by the server, the change in the plurality of network parameters, wherein the server requires a second sub-carrier spacing for the first active BWP to send the scheduled data packets to the UE, sending, by the server, BWP sub-carrier spacing change information to the UE, and dynamically switching, by the server, from the first subcarrier spacing to the second sub-carrier spacing upon sending the BWP sub-carrier spacing change information to send the scheduled data packets to the UE.

In an example embodiment, the BWP sub-carrier spacing change information is sent using the MAC element, the RRC signalling, the physical downlink channel, the broadcast message and the control message, and wherein the active BWP change information is sent to the UE using the periodic transmission and/or the aperiodic transmission.

In an example embodiment, the method includes: receiving, by the server, a message from the UE, wherein the message indicates a first optimal BWP for an identified service (e.g. call, video call, internet browsing, etc.) of an application (e.g. call application, video application, etc.) with varying Quality of Service (QoS) required at the UE, and sending, by the server, the first optimal BWP for the identified service or a second optimal BWP from the server, wherein the second optimal BWP sends to the UE based on the first optimal BWP not being available at the server.

Accordingly, an example embodiment herein provides a method for bandwidth management by a UE in the wireless communication network. The method includes: identifying a service of the application with varying QoS requirements; determining the BWP for the identified service; sending the message to the server, wherein the message indicates the first optimal BWP for the identified service is required at the UE; receiving, by the UE, the first optimal BWP for the identified service or the second optimal BWP from the server, wherein the second optimal BWP receives from the server based on the first optimal BWP not being available at the server.

Accordingly, an example embodiment provides a server for bandwidth management in the wireless communication network. The server includes: a memory; and at least one processor coupled to the memory. The at least one processor is configured to: receive a plurality of data packets from the network device for transmission to a UE; determine the plurality of network parameters associated with at least one of the network device, the UE, and the plurality of received data packets; group the plurality of received data packets based on the plurality of network parameters; allocate the BWP and/or sub-carrier spacing to each grouped data packets based on the plurality of network parameters; and send the plurality of group data packets using the allocated BWP and/or the allocated subcarrier spacing.

Accordingly, an example embodiment herein provides a UE for bandwidth management in the wireless communication network. The UE includes: a memory; and at least one processor coupled to the memory. The at least one processor is configured to: identify the service of the application with varying QoS requirements; determine the first optimal BWP for the identified service; send the message to the server, wherein the message indicates the first optimal BWP for the identified service is required at the UE; and receive the first optimal BWP for the identified service or the second optimal BWP from the server, wherein the second optimal BWP receives from the server based on the first optimal BWP not being available at the server.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein, and the embodiments herein include all such modifications.

BRIEF DESCRIPTION OF THE DRAWINGS

This disclosure is illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

Figure 1:
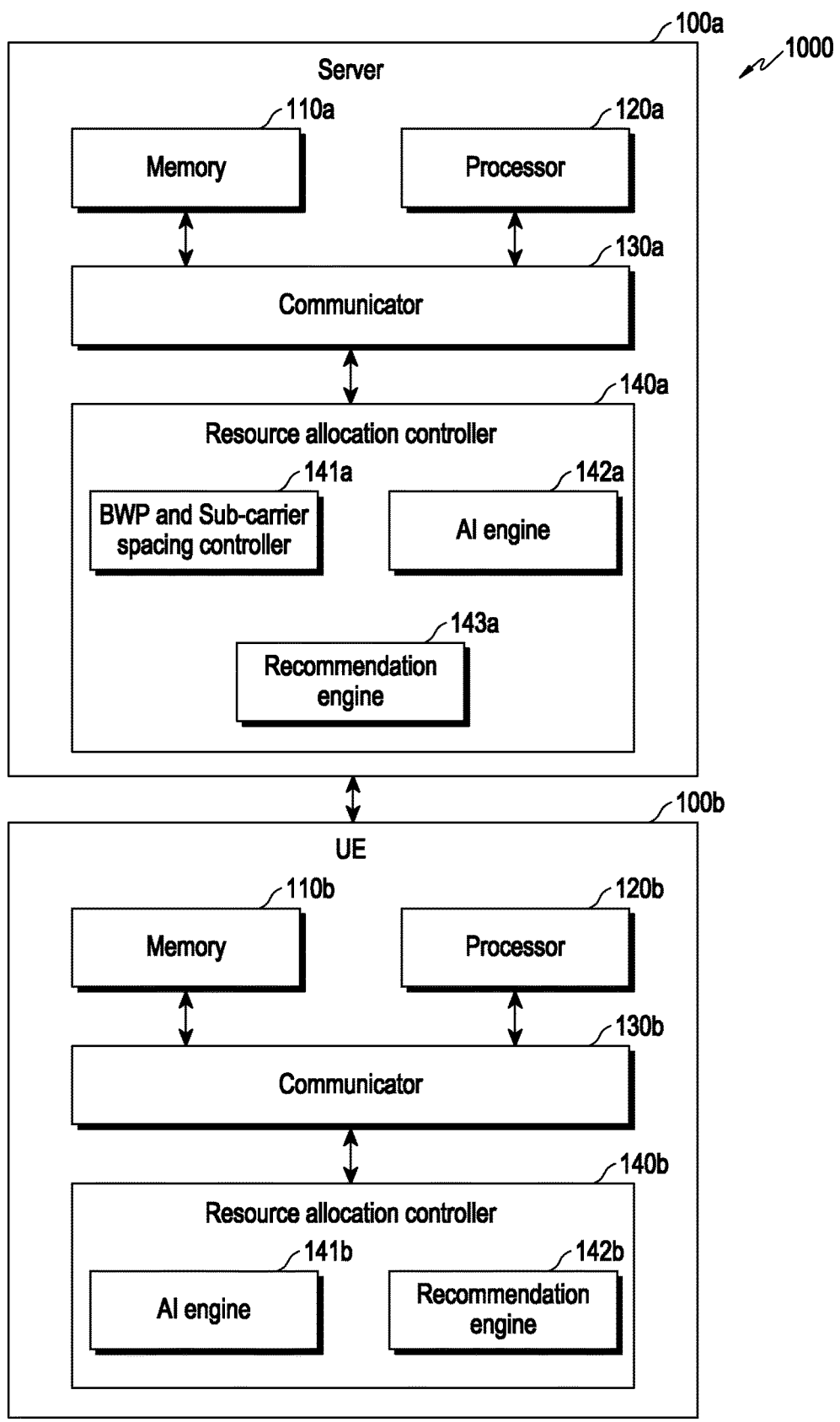
FIG. 1 is a block diagram illustrating an example configuration of a system for bandwidth management in a wireless communication network, according to various embodiments.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as various embodiments can be combined with one or more embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are provided to aid in understanding various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Below are example BWP configuration properties:
a) With respect to a Downlink (DL), a UE is not expected to receive a Physical Downlink Shared Channel (PDSCH), a Physical Downlink Control Channel (PDCCH), a Channel State Information Reference Signal (CSI-RS), or Tracking reference signals (TRS) outside an active bandwidth part.
b) Each DL BWP includes at least one CORESET with a UE Specific Search Space (USS) while primary carrier at least one of the configured DL BWPs includes one CORESET with Common Search Space (CSS).
c) With respect to a Uplink (UL), the UE does not transmit a Physical Uplink Shared Channel (PUSCH) or a Physical Uplink Control Channel (PUCCH) outside an active bandwidth part.
d) The UEs are expected to receive and transmit only within the frequency range configured for the active BWPs with the associated numerologies. However, there are exceptions; the UE may perform Radio Resource Management (RRM) measurement or transmit sounding reference signal (SRS) outside of its active BWP via measurement gap.

The Modulation Coding Scheme (MCS) depends on radio signal quality in wireless link; the better the quality, the higher the MCS and the more useful bits can be transmitted in a symbol and bad signal quality result in lower MCS meaning less useful data can be transmitted with in a symbol. The MCS basically defines the following two aspects, modulation and code rate. The modulation defines how many bits can be carried by a single resource element (RE) irrespective of it's useful bit or parity bits. 5G NR supports a Quadrature Phase Shift Keying (QPSK), 16-Quadrature Amplitude Modulation (QAM), 64-QAM and 256-QAM modulation. Code rate can be defined as the ratio between useful bit and total transmitted bit (Useful+Redundant Bits). These Redundant bits are added for Forward Error Correction (FEC). In other words, it is the ratio between the number of information bits at the top of the Physical layer and the number of bits which are mapped to PDSCH at the bottom of the Physical layer.

Below are the 5G New Radio (NR) and coding scheme characteristics:
  a) The MCS defines the numbers of useful bits per symbols.
  b) MCS selection is done based on radio condition and BLER.
  c) MCS is change by gNB based on link adaptation mechanism.
  d) MCS information is provided to UE using a Downlink Control Information (DCI).
  e) The 5G NR supports QPSK, 16-QAM, 64-QAM and 256-QAM modulation for the PDSCH.
  f) There are about 32 MCS indexes (0-31) are defined and MCS index 29, 30 and 31 are reserved and used for re-transmission.
  g) A 3GPP Specification 38.214 defines three tables for PDSCH MCS namely 64 QAM table, 256 QAM table and low spectral efficiency 64 QAM table.

Accordingly, an example embodiment herein provides a method for bandwidth management in a wireless communication network. The method includes: receiving, by a server, a plurality of data packets from a network device (e.g., base station) for transmission to a User Equipment (UE). Furthermore, the method includes determining, by the server, a plurality of network parameters associated with the network device, the UE, and the plurality of received data packets. Furthermore, the method includes grouping, by the server, the plurality of received data packets based on the plurality of network parameters. Furthermore, the method includes allocating, by the server, a Bandwidth Part (BWP) and/or a sub-carrier spacing to each grouped data packets based on the plurality of network parameters. Furthermore, the method includes sending, by the server, the plurality of group data packets using the allocated BWP and/or the allocated subcarrier spacing.

Accordingly, an example embodiment herein provides a method for bandwidth management in the wireless communication network. The method includes identifying, by the UE, a service of an application with varying QoS requirements. Furthermore, the method includes determining, by the UE, the BWP for the identified service. Furthermore, the method includes sending, by the UE, the message to the server, where the message indicates the first optimal BWP for the identified service is required at the UE. Furthermore, the method includes receiving, by the UE, the first optimal BWP for the identified service or the second optimal BWP from the server, where the second optimal BWP receives from the server when the first optimal BWP is not available at the server.

Accordingly, an example embodiment herein provides a server for bandwidth management in the wireless communication network. The server includes a resource allocation controller coupled with a processor and a memory. The resource allocation controller receives the plurality of data packets from the network device for transmission to the UE. Furthermore, the resource allocation controller determines the plurality of network parameters associated with the network device, the UE, and the plurality of received data packets. Furthermore, the resource allocation controller groups the plurality of received data packets based on the plurality of network parameters. Furthermore, the resource allocation controller allocates the BWP and/or sub-carrier spacing to each grouped data packets based on the plurality of network parameters. Furthermore, the resource allocation controller sends the plurality of group data packets using the allocated BWP and/or the allocated subcarrier spacing.

Accordingly, an example embodiment herein provides a UE for bandwidth management in the wireless communication network. The UE includes a resource allocation controller coupled with a processor and a memory. The resource allocation controller identifies the service of the application with varying QoS requirements. Furthermore, the resource allocation controller determines the first optimal BWP for the identified service. Furthermore, the resource allocation controller sends the message to the server, where the message indicates the first optimal BWP for the identified service is required at the UE. Furthermore, the resource allocation controller receives the first optimal BWP for the identified service or the second optimal BWP from the server, where the second optimal BWP receives from the server when the first optimal BWP is not available at the server.

Unlike existing methods and systems, the disclosed methods for dynamically switching between active Bandwidth Part(s) (BWPs) and/or Modulation Coding Scheme(s) (MCSs) to transmit multiple Quality of Service (QoS) data/groups based on a plurality of parameters (e.g. load conditions of a User Equipment (UE), throughput requirement of the UE, active profile of the UE, etc.) using Machine Learning (ML)/Artificial Intelligence (AI) mechanism. The multiple QoS data/groups are transmitted simultaneously/periodically/non-periodically to the UE using a MAC control element and/or RRC message and/or physical downlink channel and/or broadcast message and/or control message. As a result, the UE's QoS will increase and enhance user experience, throughput, and latency.

Unlike existing methods and systems, the disclosed methods allocate multiple active BWPs to transmit multiple QoS data/groups based on the plurality of parameters using the ML/AI mechanism. The multiple QoS data/groups are transmitted simultaneously/periodically/non-periodically to the UE using the MAC control element and/or RRC message and/or physical downlink channel and/or broadcast message and/or control message. As a result, the UE's QoS will increase and enhance user experience, throughput, and latency.

Unlike existing methods and systems, the disclosed methods dynamically change active BWPs sub-carrier spacing to transmit multiple QoS data/groups based on the plurality of parameters using the ML/AI mechanism. The multiple QoS data/groups are transmitted simultaneously/periodically/ non-periodically to the UE using the MAC control element and/or RRC message and/or physical downlink channel and/or broadcast message and/or control message. As a result, the UE's QoS will increase and enhance user experience, throughput, and latency.

Unlike existing methods and systems, the disclosed methods send a recommended BWPs request, by the UE, to a server (e.g., network, cloud network, etc.) for uplink data transmission through the MAC control element based on the plurality of parameters (e.g. UE related parameters) and the server activates/deactivates BWPs per time slot for the UE.

Existing networks (for example, servers) allot the UE with just one active BWP where RRC connection is sent during the attach procedure; if the network provides more active BWP after the attach procedure, this indicates that some type of prediction mechanism is required at a server (e.g., eNB, gNB, etc.). Furthermore, in the existing network, the UE is unable to request the recommended BWP. If the UE transmits an RRC message (new message) or a MAC Control Element (MAC CE), this indicates that the UE requires some sort of prediction mechanism.

Furthermore, the existing network schedules all services (e.g. 5QIs) in same BWP. In a case that BWP switching happens, all services will switch to a new BWP. In a case that the existing network schedules some 5QIs in certain BWPs and other 5QIs in other BWPs and switches the BWP/TTI, this indicates that some form of prediction mechanism is required at the server. Furthermore, the existing network activates only BWP and schedules data only in one BWP. If the network schedules through multiple BWPs simultaneously, this indicates that some form of prediction mechanism is required at the server.

Furthermore, the existing network's server does not have the capability to process a Neural Network (NN), so a separate NN entity has to be configured to which input parameters for handover target prediction and output has to be sent in a nonstandard/proprietary mechanism. Despite virtual Radio Access Network (vRAN) solutions deployed on virtualized solution, NN implementation is resource intensive and a separate module has to be configured for the same. As with the traditional server, this will be through a non-standard interface. Furthermore, the O1 & E2 interfaces have been standardized for data collection in Open Radio Access Network (O-RAN) Architecture. So the NN input parameters can be easily traced on the interface.

Referring now to the drawings and more particularly to FIGS. 1 through 6, where similar reference characters denote corresponding features consistently throughout the figures, there are illustrated and described various example embodiments.

FIG. 1 is a block diagram illustrating an example configuration of a system (1000) for bandwidth management in a wireless communication network, according to various embodiments. The system (1000) includes a server (100a) and a User Equipment (UE) (100b). Examples of the server (100a) include, but are not limited, to Centralized Radio Access Network/Virtual Radio Access Network (CRAN/VRAN), base station, etc. Examples of the UE (100b), include but is not limited, to a smart phone, an Internet of Things (IoT) device, a wearable device, a mobile device, etc.

In an embodiment, the server (100a) includes a memory (110a), a processor (e.g., including processing circuitry) (120a), a communicator (e.g., including communication circuitry) (130a), and a resource allocation controller (e.g., including various processing circuitry and/or executable program instructions) (140a).

In an embodiment, the memory (110a) stores a plurality of network parameters (e.g., Quality of Service (QoS) parameters, a total available bandwidth, etc.), an allocated Bandwidth Part (BWP), and an allocated sub-carrier spacing, etc. The memory (110a) stores instructions to be executed by the processor (120a). The memory (110a) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110a) may, in some examples, be considered a non-transitory storage medium. The term "non-transitory" may indicate that the storage medium is not embodied in a carrier wave or a propagated signal. However, the term "non-transitory" should not be interpreted that the memory (110a) is non-movable. In some examples, the memory (110a) can be configured to store larger amounts of information than the memory. In certain examples, a non-transitory storage medium may store data that can, over time, change (e.g., in Random Access Memory (RAM) or cache). The memory (110a) can be an internal storage unit or it can be an external storage unit of the server (100a), a cloud storage, or any other type of external storage.

The processor (120a) may include various processing circuitry and communicates with the memory (110a), the communicator (130a), and the resource allocation controller (140a). The processor (120a) is configured to execute instructions stored in the memory (110a) and to perform various processes. The processor (120a) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130a) may include various communication circuitry and is configured for communicating internally between internal hardware components and with external devices (e.g. eNodeB, gNodeB, UE, etc.) via one or more networks (e.g. Radio technology). The communicator (130a) includes an electronic circuit specific to a standard that enables wired or wireless communication.

The resource allocation controller (140a) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. In some embodiments, the resource allocation controller (140a) and the processor (120a) may be integrally referred to as at least one processor.

In an embodiment, the resource allocation controller (140a) includes a BWP and sub-carrier spacing controller (141a), an Artificial intelligence (AI) engine (142a), and a recommendation engine (143a). Throughout this disclosure, the terms "AI engine" and "AI model" are used interchangeably.

In an embodiment, the BWP and sub-carrier spacing controller (141a) receives a plurality of data packets from a network device (e.g. base station) for transmission to the UE (100b). Furthermore, the BWP and sub-carrier spacing controller (141a) determines a plurality of network parameters associated with the network device, the UE (100b), and the plurality of received data packets. The plurality of network parameters includes a Quality of Service (QoS) parameters of the plurality of received data packets, a status of a base station, a total available bandwidth at the base station, a require load condition of the UE (100b), a user-specific input, an active profile of the UE (100b), a service type, a requirement of Block Error Rate (BLER), a packet loss tolerance, a UE category, a QoS Class Identifier (QCI) load status, a coherence time, and a coherence bandwidth.

In an embodiment, the BWP and sub-carrier spacing controller (141a) generates the AI model (142a) using the plurality of network parameters and a time, where the AI model (142a) utilizes, for example, a Reinforcement Learning. Furthermore, the BWP and sub-carrier spacing controller (141a) groups the plurality of received data packets using the AI model (142a).

In an embodiment, the BWP and sub-carrier spacing controller (141a) allocates a Bandwidth Part (BWP) and/or a sub-carrier spacing to each grouped data packets based on the plurality of network parameters. Furthermore, the BWP and sub-carrier spacing controller (141a) sends the plurality of group data packets using the allocated BWP and/or the allocated subcarrier spacing.

In an embodiment, the BWP and sub-carrier spacing controller (141a) schedules a transmission of grouped data packets over the allocated BWP and/or the allocated sub-carrier spacing. Furthermore, the BWP and sub-carrier spacing controller (141a) dynamically switches the allocated BWP and/or the allocated subcarrier spacing based on the plurality of network parameters. Furthermore, the BWP and sub-carrier spacing controller (141a) sends the scheduled data packets to the UE (100b).

In an embodiment, the BWP and sub-carrier spacing controller (141a) sends the scheduled data packets to the UE (100b) using a first active BWP of the BWP. Furthermore, the BWP and sub-carrier spacing controller (141a) detects a change in the plurality of network parameters, where the server (100a) requires a second active BWP of the BWP to send the scheduled data packets to the UE (100b). Furthermore, the BWP and sub-carrier spacing controller (141a) sends active BWP change information to the UE (100b). The active BWP change information is sent using a Medium Access Control (MAC) element, a Radio Resource Control (RRC) signalling, a physical downlink channel, a broadcast message and a control message, and where the active BWP change information is sent to the UE (100b) using a periodic transmission and/or aperiodic transmission. Furthermore, the BWP and sub-carrier spacing controller (141a) dynamically switches from the first active BWP to a second active BWP upon sending the active BWP change information to send the scheduled data packets to the UE (100b).

In an embodiment, the BWP and sub-carrier spacing controller (141a) sends the scheduled data packets to the UE (100b) using the first active BWP of the BWP. Furthermore, the BWP and sub-carrier spacing controller (141a) detects a change in the plurality of network parameters, where the server (100a) requires the second active BWP of the BWP to send the scheduled data packets to the UE (100b). Furthermore, the BWP and sub-carrier spacing controller (141a) sends additional BWP change information to the UE (100b). Furthermore, the BWP and sub-carrier spacing controller (141a) simultaneously sends the scheduled data packets to the UE (100b) using the first active BWP and the second active BWP. Furthermore, the BWP and sub-carrier spacing controller (141a) detects a change in the plurality of network parameters, where the server (100a) requires the first active BWP of the BWP to send the scheduled data packets to the UE (100b). Furthermore, the BWP and sub-carrier spacing controller (141a) sends deactivation of the BWP change information to the UE (100b). Furthermore, the BWP and sub-carrier spacing controller (141a) dynamically switches to the first active BWP upon sending the deactivation of the BWP change information to send the scheduled data packets to the UE (100b). The additional BWP change information and deactivation of the BWP change information utilize the MAC element, the RRC signalling, the physical downlink channel, the broadcast message and the control message, and where the active BWP change information is sent to the UE (100b) using the periodic transmission and/or the aperiodic transmission.

In an embodiment, the BWP and sub-carrier spacing controller (141a) sends the scheduled data packets to the UE (100b) using the first active BWP of the BWP. Furthermore, the BWP and sub-carrier spacing controller (141a) detects a change in the plurality of network parameters, where the server (100a) requires the second active BWP of the BWP to send the scheduled data packets to the UE (100b). Furthermore, the BWP and sub-carrier spacing controller (141a) sends BWP sub-carrier spacing change information to the UE (100b). Furthermore, the BWP and sub-carrier spacing controller (141a) dynamically switches from the first subcarrier spacing to the second sub-carrier spacing upon sending the BWP sub-carrier spacing change information to send the scheduled data packets to the UE (100b). The BWP sub-carrier spacing change information is sent using the MAC element, the RRC signalling, the physical downlink channel, the broadcast message and the control message, and where the active BWP change information is sent to the UE (100b) using the periodic transmission and/or the aperiodic transmission.

In an embodiment the recommendation engine (143a) receives a message from the UE (100b), where the message indicates a first optimal BWP for an identified service of an application with varying Quality of Service (QoS) is required at the UE (100b). Furthermore, the recommendation engine (143a) sends the first optimal BWP for the identified service or a second optimal BWP from the server (100a), where the second optimal BWP has send to the UE (100b) when the first optimal BWP is not available at the server (100a).

In an embodiment, the UE (100b) includes a memory (110b), a processor (e.g., including processing circuitry) (120b), a communicator (e.g., including communication circuitry) (130b), and a resource allocation controller (e.g., including various processing circuitry and/or executable program instructions) (140b).

The memory (110b) stores the plurality of network parameters (e.g., QoS parameters, total available bandwidth, etc.), allocated Bandwidth Part (BWP), and allocated sub-carrier spacing, etc. The memory (110b) stores instructions to be executed by the processor (120b). The memory (110b) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110b) may, in some examples, be considered a non-transitory storage medium. The term "non-transitory" may indicate that the storage medium is not embodied in a carrier wave or a propagated signal. However, the term "non-transitory" should not be interpreted that the memory (110b) is non-movable. In some examples, the memory (110b) can be configured to store larger amounts of information than the memory. In certain examples, a non-transitory storage medium may store data that can, over time, change (e.g., in Random Access Memory (RAM) or cache). The memory (110b) can be an internal storage unit or it can be an external storage unit of the UE (100b), a cloud storage, or any other type of external storage.

The processor (120b) may include various processing circuitry and communicates with the memory (110b), the communicator (130b), and the resource allocation controller (140b). The processor (120b) is configured to execute instructions stored in the memory (110b) and to perform various processes. The processor (120b) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130b) may include various communication circuitry and is configured for communicating internally between internal hardware components and with external devices (e.g. eNodeB, gNodeB, UE, etc.) via one or more networks (e.g. Radio technology). The communicator (130b) includes an electronic circuit specific to a standard that enables wired or wireless communication.

The resource allocation controller (140b) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. In some embodiments, the resource allocation controller (140b) and the processor (120b) may be integrally referred to as at least one processor.

In an embodiment, the resource allocation controller (140b) includes an AI engine (141b) and a recommendation engine (142b). The AI engine (141b) identifies the service (e.g. call, video call, internet browsing, etc.) of the application (e.g., call application, video application, etc.) with varying QoS requirements. Furthermore, the AI engine (141b) determines the first optimal BWP for the identified service. The recommendation engine (142b) sends the message to the server (100a), where the message indicates the first optimal BWP for the identified service is required at the UE (100b). Furthermore, the recommendation engine (142b) receives first optimal BWP for the identified service or the second optimal BWP from the server (100a), where the second optimal BWP receives from the server (100a) when the first optimal BWP is not available at the server (100a).

In an embodiment, a function associated with the AI engine (142a/141b) may be performed through memory (110b) and the processor (120b). The one or a plurality of processors controls the processing of the input data in accordance with a predefined operating rule or the AI engine (142a/141b) stored in the non-volatile memory and the volatile memory. The predefined operating rule or artificial intelligence model is provided through training or learning.

Being provided through learning may refer, for example to, by applying a learning process to a plurality of learning data, a predefined operating rule or the AI engine (142a/141b) of the desired characteristic being made. The learning may be performed in the server (100a) and/or UE (100b) itself in which AI according to an embodiment is performed, and/or maybe implemented through a separate server/system.

The AI engine (142a/141b) may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although FIG. 1 shows various hardware components of the system (1000) it is to be understood that various embodiments are not limited thereon. In various embodiments, the system (1000) may include less or more number of components. Further, the labels or names of the components are used only for illustrative purpose and does not limit the scope of the disclosure. One or more components can be combined together to perform same or substantially similar function for bandwidth management in the wireless communication network.

Figure 2:
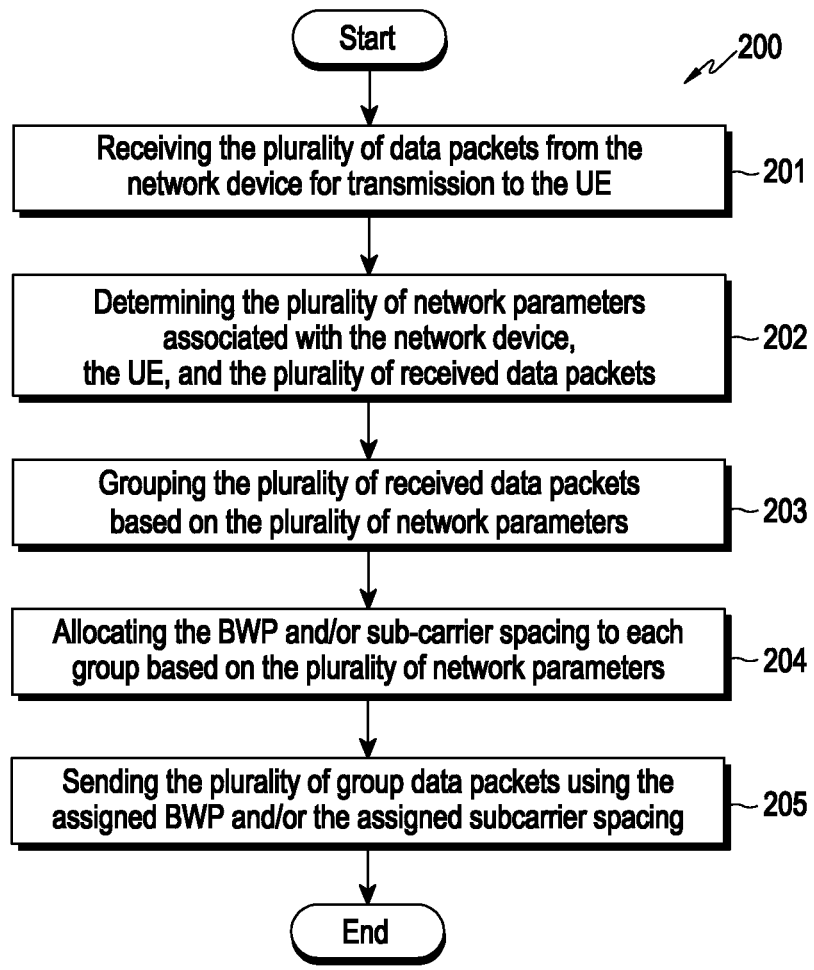
FIG. 2 is a flowchart illustrating an example method for bandwidth management in the wireless communication network, according to various embodiments.

FIG. 2 is a flowchart (200) illustrating an example method for bandwidth management in the wireless communication network, according to various embodiments. Operations (201 to 205) may be performed by the server (100a) for allocating resource in the multiple BWP system At 201, the method includes receiving the plurality of data packets from the network device for transmission to the UE (100b). At 202, the method includes determining the plurality of network parameters associated with the network device, the UE (100b), and the plurality of received data packets. At 203, the method includes grouping the plurality of received data packets based on the plurality of network parameters. At 204, the method includes allocating the BWP and/or the sub-carrier spacing to each grouped data packets based on the plurality of network parameters. At 205, the method includes sending the plurality of group data packets using the allocated BWP and/or the allocated subcarrier spacing.

The various actions, acts, blocks, steps, or the like in the flowchart (200) may be performed in the order presented, in a different order or simultaneously. Further, in various embodiments, some of the actions, acts, blocks, steps, or the like may be omitted, added, modified, skipped, or the like without departing from the scope of the disclosure.

Figure 3A:
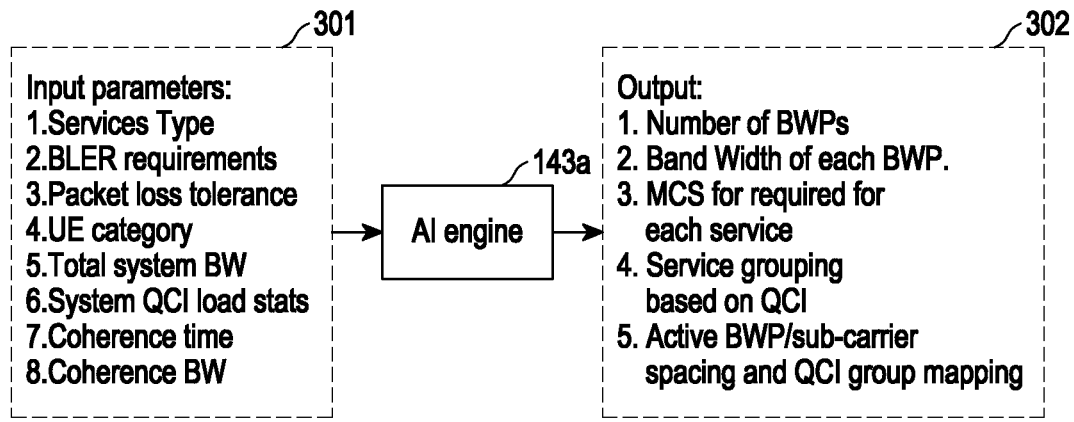
FIGS. 3A, 3B and 3C include diagrams illustrating example Neural Network (NN) architecture(s) and a signal flow diagram illustrating an example operation in which a server dynamically switches between active Bandwidth Parts (BWPs) and/or Modulation Coding Schemes (MCSs) using a single active BWP to transmit multiple Quality of Service (QoS) data/groups based on a plurality of parameters using a resource allocation controller of the server, according to various embodiments.
Figure 3B:
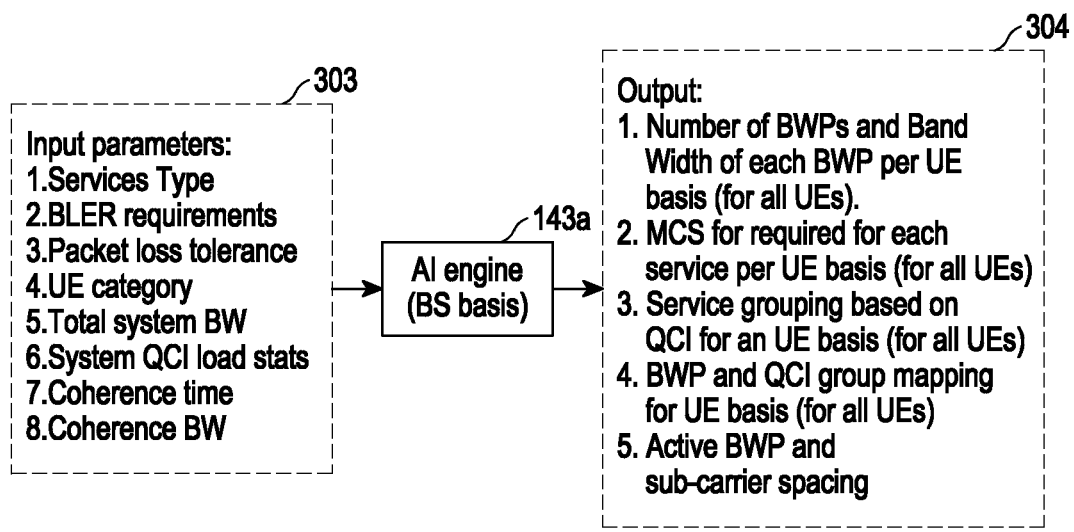
Figure 3C:
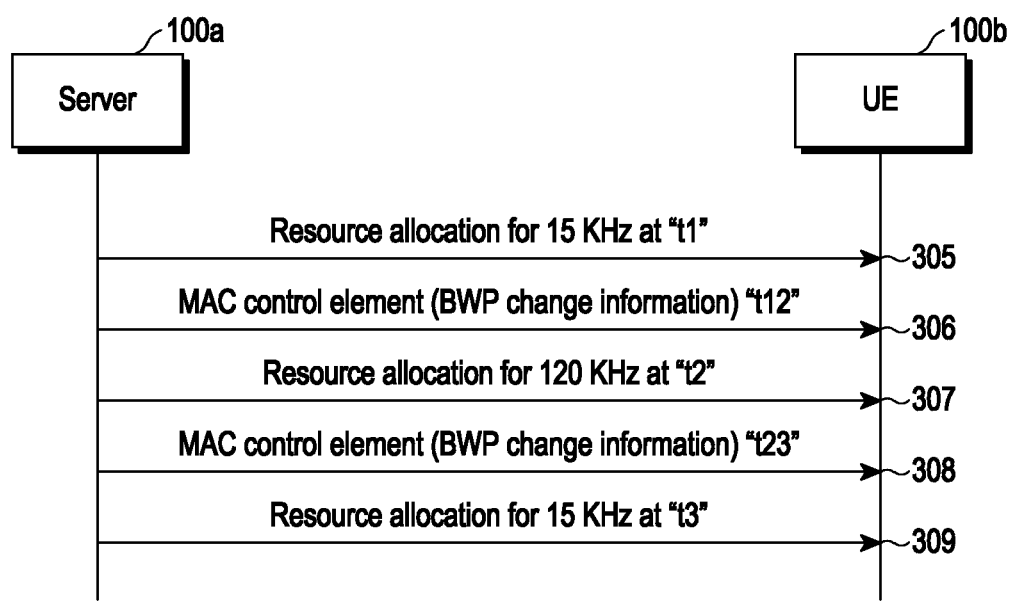

FIGS. 3A, 3B and 3C include diagrams illustrating example Neural Network (NN) architecture(s) and a signal flow diagram illustrating an example in which the server (100a) dynamically switches between active Bandwidth Parts (BWPs) and/or Modulation Coding Schemes (MCSs) using a single active BWP to transmit multiple Quality of Service (QoS) data/groups based on the plurality of parameters using a resource allocation controller (140a) of the server (100a), according to various embodiments.

Referring to FIG. 3A, FIG. 3A illustrates an example NN architecture on a per UE basis at the server (100a), where the AI engine (143a) of the resource allocation controller (140a) receives the plurality of parameters (301) (e.g., service type, BLER requirements, packet loss tolerance, UE category, total system bandwidth (BW), system QCI load stats, coherence time, coherence BW, etc.) from various network entities (e.g. UE (100b), cloud network, etc.). The AI engine (143a) predicts output values (302) (e.g., number of BWPs, the bandwidth of each BWP, MCS required for each service, service grouping based on QCI, active BWP/sub-carrier spacing, and QCI group mapping) for the resource allocation to the UE (100b), where the AI engine (143a) is implemented using, for example, a deep reinforcement learning. The AI engine (143a) then conveys the predicted output values (302) periodically or dynamically to the UE (100b) using the MAC element or RRC message.

Referring to FIG. 3B, FIG. 3B illustrates an example NN architecture on per server (e.g., base station) basis at the server (100a), where the AI engine (143a) of the resource allocation controller (140a) receives the plurality of parameters (303) (e.g., service type, BLER requirements, packet loss tolerance, UE category, total system bandwidth (BW), system QCI load stats, coherence time, coherence BW, etc.) from various network entities (e.g. UE (100b), cloud network, etc.). The AI engine (143a) predicts output values (304) (e.g., number of BWPs and bandwidth of each BWP per UE basis (for all UEs), MCS required for each service per UE basis (for all UEs), service grouping based on QCI for a UE basis (for all UEs), BWP and QCI group mapping for UE basis (for all UEs), active BWP and sub-carrier spacing, etc.) for the resource allocation to the UE (100b), where the AI engine (143a) is implemented using, for example, the deep reinforcement learning. The AI engine (143a) then conveys the predicted output values (306) periodically or dynamically to each UE (100b) using the MAC element or RRC message.

Referring to FIG. 3C, FIG. 3C is a signal flow diagram illustrating an example operation. As explained previously, the existing method has a limitation in that the network can assign a maximum of four bandwidth parts (BWP) to the UE, but only one BWP is operational at any given moment even though multiple QoS applications are running in the background of the UE. To address the limitation, the disclosed method offers a solution in which the server (100a) (e.g., network) sends different applications data of the UE (100b) on different BWP with sub-carrier spacing/MCS using a single active BWP, based on the UE (100b) QoS requirements and other system QoS load stats, system bandwidth, BWP bandwidth(s). Where the neural network is maintained by the server (100a) (e.g., Base Station (BS)/cloud system) on a per-UE or per-BS basis.

Furthermore, the server (100a) uses the MAC control element or the RRC message to dynamically change the active BWP/MCS before switching the QoS data transmission stream of the UE (100a), which has varied sub-carrier spacing. The frequency of switching active BWP (inactive BWP will become active and previously active BWP will be de-activated)/MCS as a function of data requirements of various applications of the UE (100b) and system QoS/QCI current and future load circumstances forecast.

For example, for time slot "t1" (305), the server (100a) allocates a sub-carrier of BWP1 (only one active BWP at t1)/MCS is 15 KHz for a voice call data to the UE (100b). For time slot "t12" (306), the server (100a) sends the BWP change information (e.g., 15 KHz to 120 KHz) to the UE (100b) using the MAC control element. For time slot "t2" (307), the server (100a) updates the BWP2/MCS (only one active BWP at t2) of sub-carrier 120 KHz to transmit Ultra-Reliable Low Latency Communications (URLLC) data type to the UE (100b). At time slot "t23" (308), the server (100a) sends the BWP change information (e.g., 120 KHz to 15 KHz) to the UE (100b) using the MAC control element. At time slot "t3" (309), the server (100a) allocates a sub-carrier of BWP1/MCS (only one active BWP at t1) updates as 15 KHz to transmit the voice call data to the UE (100b) (the server (100a) utilizes different BWPs, at a given point of time, only one BWP is active).

Figure 4A:
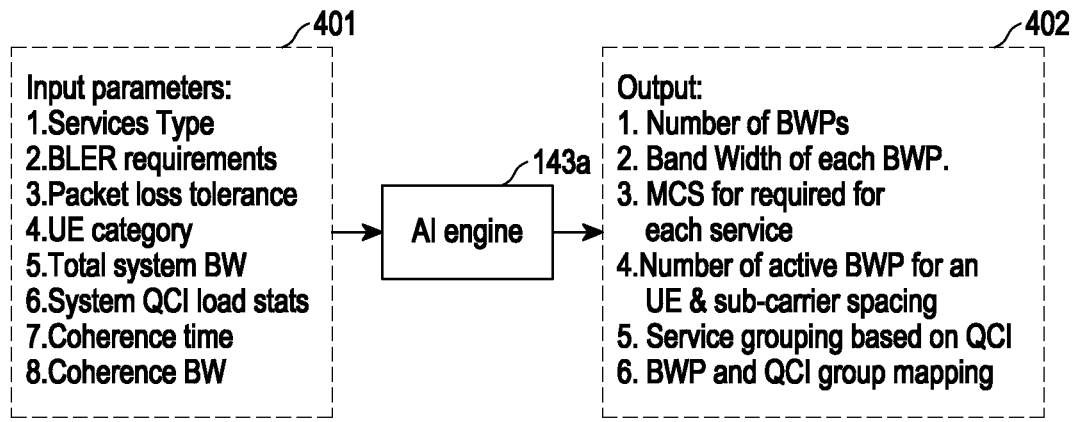
FIGS. 4A, 4B and 4C including diagrams illustrating example NN architecture(s) and a signal flow diagram illustrating an example operation in which the server dynamically switches between the active BWPs and/or the MCSs using multiple active BWPs to transmit the multiple QoS data/groups based on the plurality of parameters using the resource allocation controller of the server, according to various embodiments.
Figure 4B:
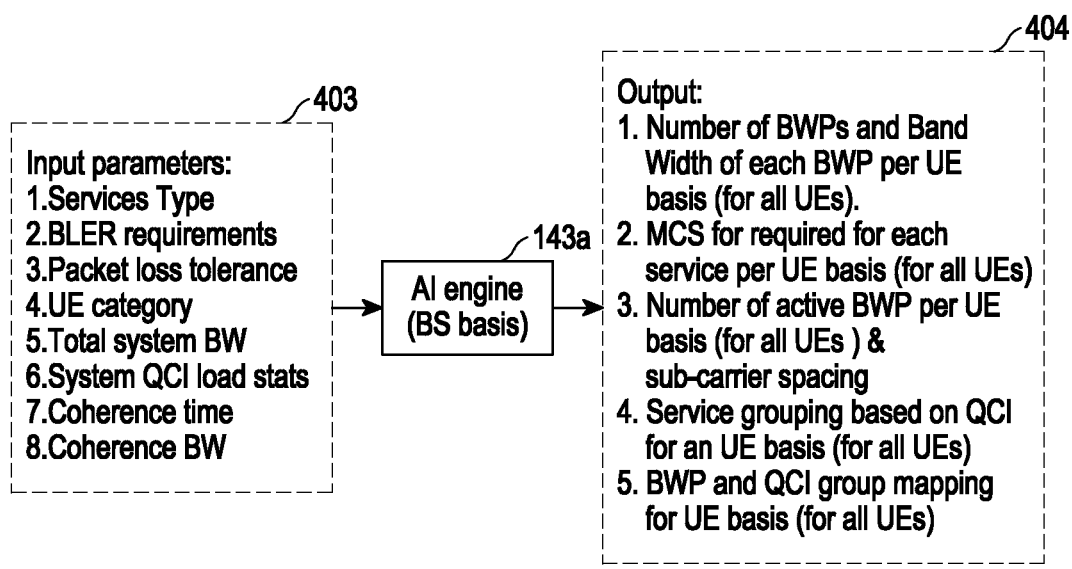
Figure 4C:
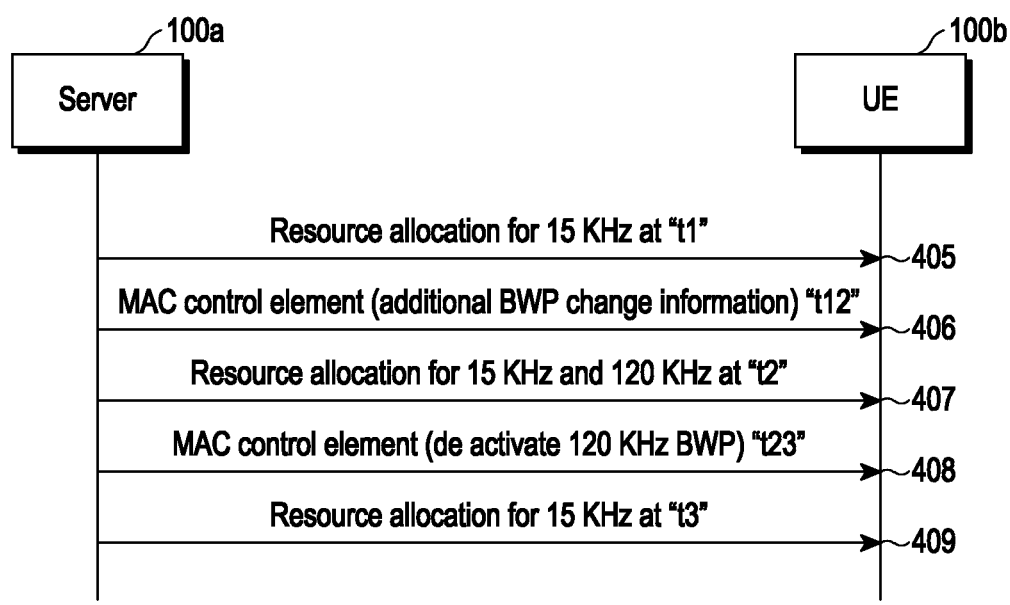

FIGS. 4A, 4B and 4C include diagrams illustrating example NN architecture(s) and a signal flow diagram illustrating an example in which the server (100a) dynamically switches between the active BWPs and/or the MCSs using multiple active BWPs to transmit the multiple QoS data/groups based on the plurality of parameters using the resource allocation controller (140a) of the server (100a), according to various embodiments.

Referring to FIG. 4A, FIG. 4A illustrates an example NN architecture on a per UE basis at the server (100a), where the AI engine (143a) of the resource allocation controller (140a) receives the plurality of parameters (401) (e.g., service type, BLER requirements, packet loss tolerance, UE category, total system bandwidth (BW), system QCI load stats, coherence time, coherence BW, etc.) from various network entities (e.g. UE (100b), cloud network, etc.). The AI engine (143a) predicts output values (402) (e.g., number of BWPs, the bandwidth of each BWP, MCS required for each service, number of active BWP for the UE & sub-carrier spacing, service grouping based on QCI, BWP, and QCI group mapping, etc.) for the resource allocation to the UE (100b), where the AI engine (143a) is implemented using, for example, the deep reinforcement learning. The AI engine (143a) then conveys the predicted output values (402) periodically or dynamically to the UE (100b) using the MAC element or RRC message.

Referring to FIG. 4B, FIG. 4B illustrates an example NN architecture on per server (e.g., base station) basis at the server (100a), where the AI engine (143a) of the resource allocation controller (140a) receives the plurality of parameters (403) (e.g., service type, BLER requirements, packet loss tolerance, UE category, total system bandwidth (BW), system QCI load stats, coherence time, coherence BW, etc.) from various network entities (e.g. UE (100b), cloud network, etc.). The AI engine (143a) predicts output values (404) (e.g., number of BWPs and Band Width of each BWP per UE basis (for all UEs), MCS required for each service per UE basis (for all UEs), number of active BWP per UE basis (for all UEs) & sub-carrier spacing, service grouping based on QCI for a UE basis (for all UEs), BWP and QCI group mapping for UE basis (for all UEs), etc.) for the resource allocation to the UE (100b), where the AI engine (143a) is implemented using, for example, the deep reinforcement learning. The AI engine (143a) then conveys the predicted output values (404) periodically or dynamically to each UE (100b) using the MAC element or RRC message.

Referring to FIG. 4C, FIG. 4C is a signal flow diagram illustrating an example operation. As explained previously, the existing method has a limitation in that the network can assign the maximum of four bandwidth parts (BWP) to the UE, but only one BWP is operational at any given moment even though multiple QoS applications are running in the background of the UE. To address the limitation, the disclosed method offers a solution in which the server (100a) (e.g., network) sends different applications data of the UE (100b) on different BWP with sub-carrier spacing/MCS using the multiple active BWP, based on the UE (100b) QoS requirements and other system QoS load stats, system bandwidth, BWP bandwidth(s). Where the neural network is maintained by the server (100a) (e.g., Base Station (BS)/cloud system) on a per-UE or per-BS basis.

Furthermore, the server (100a) enables multiple Active BWPs, which have different sub-carrier/MCS spacing using the MAC control element or the RRC message. Dynamically, one can active as many BWPs as possible, a maximum of up to four BWPs.

For example, for time slot "t1" (405), the server (100a) allocates the sub-carrier of BWP1 (only one active BWP at t1)/MCS is 15 KHz for the voice call data to the UE (100b). For time slot "t12" (406), the server (100a) sends an additional BWP change information (e.g., 15 KHz and 120 KHz) to the UE (100b) using the MAC control element. For time slot "t2" (407), the server (100a) updates the BWP2/MCS (multiple active BWP at t2) of sub-carrier 15 KHz and 120 KHz to transmit Ultra-Reliable Low Latency Communications (URLLC) data type to the UE (100b). At time slot "t23" (408), the server (100a) sends a deactivate 120 KHz BWP change information to the UE (100b) using the MAC control element. At time slot "t3" (409), the server (100a) allocates the sub-carrier of BWP1/MCS (only one active BWP at t1) updates as 15 KHz to transmit the voice call data to the UE (100b) (the server (100a) utilizes different BWPs, at a given point of time, active as many BWP as possible, maximum up to four BWPs).

Figure 5A:
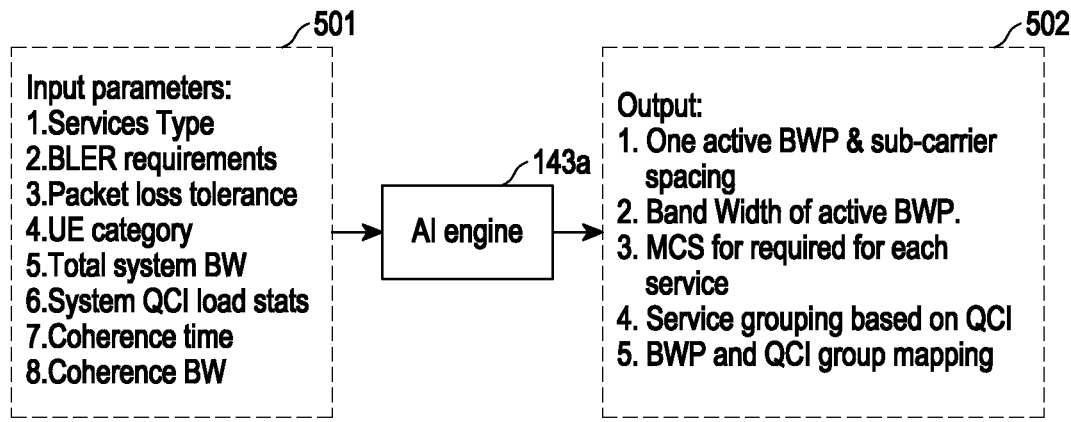
FIGS. 5A, 5B and 5C include diagrams illustrating example NN architecture(s) and a signal flow diagram illustrating an example operation in which the server dynamically changes the active BWPs's sub-carrier spacing to the transmit multiple QoS data/groups based on the plurality of parameters using the resource allocation controller of the server, according to various embodiments.
Figure 5B:
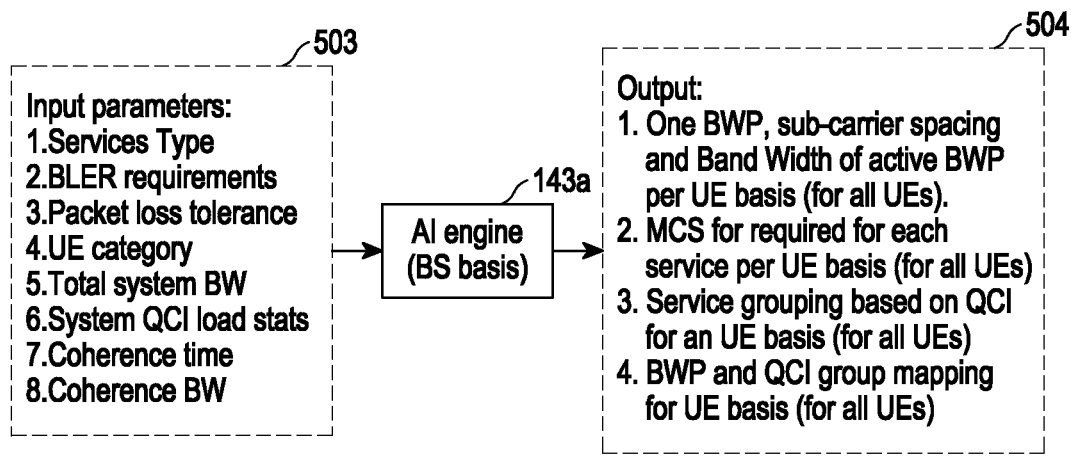
Figure 5C:
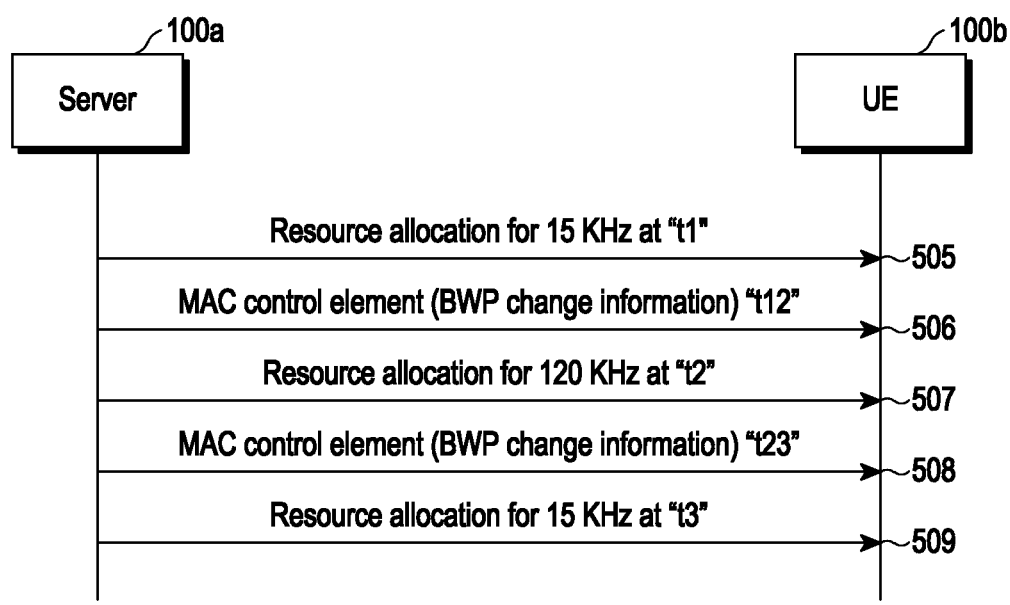

FIGS. 5A, 5B and 5C include diagrams illustrating example NN architecture(s) and a signal flow diagram illustrating an example operation in which the server (100a) dynamically changes the active BWPs's sub-carrier spacing to the transmit multiple QoS data/groups based on the plurality of parameters using the resource allocation controller (140a) of the server (100a), according to various embodiments.

Referring to FIG. 5A, FIG. 5A illustrates an example NN architecture on a per UE basis at the server (100a), where the AI engine (143a) of the resource allocation controller (140a) receives the plurality of parameters (501) (e.g., service type, BLER requirements, packet loss tolerance, UE category, total system bandwidth (BW), system QCI load stats, coherence time, coherence BW, etc.) from various network entities (e.g. UE (100b), cloud network, etc.). The AI engine (143a) predicts output values (502) (e.g., One active BWP & sub-carrier spacing, the bandwidth of active BWP, MCS required for each service, service grouping based on QCI, BWP, and QCI group mapping, etc.) for the resource allocation to the UE (100b), where the AI engine (143a) is implemented using, for example, the deep reinforcement learning. The AI engine (143a) then conveys the predicted output values (502) periodically or dynamically to the UE (100b) using the MAC element or RRC message.

Referring to FIG. 5B, FIG. 5B illustrates an example NN architecture on per server (e.g., base station) basis at the server (100a), where the AI engine (143a) of the resource allocation controller (140a) receives the plurality of parameters (503) (e.g., service type, BLER requirements, packet loss tolerance, UE category, total system bandwidth (BW), system QCI load stats, coherence time, coherence BW, etc.) from various network entities (e.g. UE (100b), cloud network, etc.). The AI engine (143a) predicts output values (504) (e.g., one BWP, sub-carrier spacing and Band Width of active BWP per UE basis (for all UEs), MCS for required for each service per UE basis (for all UEs), service grouping based on QCI for a UE basis (for all UEs), BWP and QCI group mapping for UE basis (for all UEs), etc.) for the resource allocation to the UE (100b), where the AI engine (143a) is implemented using, for example, the deep reinforcement learning. The AI engine (143a) then conveys the predicted output values (504) periodically or dynamically to each UE (100b) using the MAC element or RRC message.

Referring to FIG. 5C, FIG. 5C illustrates an example operation. As explained previously, the existing method has a limitation in that the network can assign the maximum of four bandwidth parts (BWP) to the UE, but only one BWP is operational at any given moment even though multiple QOS applications are running in the background of the UE. To address the limitation, the disclosed method offers a solution in which the server (100a) (e.g., network) sends different applications data of the UE (100b) on different sub-carrier spacing/MCS using a single active BWP, based on the UE (100b) QoS requirements and other system QoS load stats, system bandwidth, BWP bandwidth(s). Where the neural network is maintained by the server (100a) (e.g., Base Station (BS)/cloud system) on a per-UE or per-BS basis.

Furthermore, the server (100a) uses the MAC control element or the RRC message to dynamically change the sub-carrier spacing/MCS before switching the QoS data transmission stream of the UE (100a), which has varied sub-carrier spacing. The frequency of switching sub-carrier spacing/MCS of the active BWP (inactive BWP will become active and previously active BWP will be de-activated)/MCS as a function of data requirements of various applications of the UE (100b) and system QoS/QCI current and future load circumstances forecast.

For example, for time slot "t1" (505), the server (100a) allocates a sub-carrier of BWP1 (only one active BWP at t1)/MCS is 15 KHz for the voice call data to the UE (100b). For time slot "t12" (506), the server (100a) sends the BWP change information (e.g., 15 KHz to 120 KHz) to the UE (100b) using the MAC control element. For time slot "t2" (507), the server (100a) updates the BWP2/MCS (only one active BWP at t2) of sub-carrier 120 KHz to transmit the URLLC data type to the UE (100b). At time slot "t23" (508), the server (100a) sends the BWP change information (e.g., 120 KHz to 15 KHz) to the UE (100b) using the MAC control element. At time slot "t3" (509), the server (100a) allocates a sub-carrier of BWP1/MCS (only one active BWP at t1) updates as 15 KHz to transmit the voice call data to the UE (100b) (the server (100a) utilizes same active BWP, but dynamically update the sub-carrier spacing of the active BWP).

Figure 6:
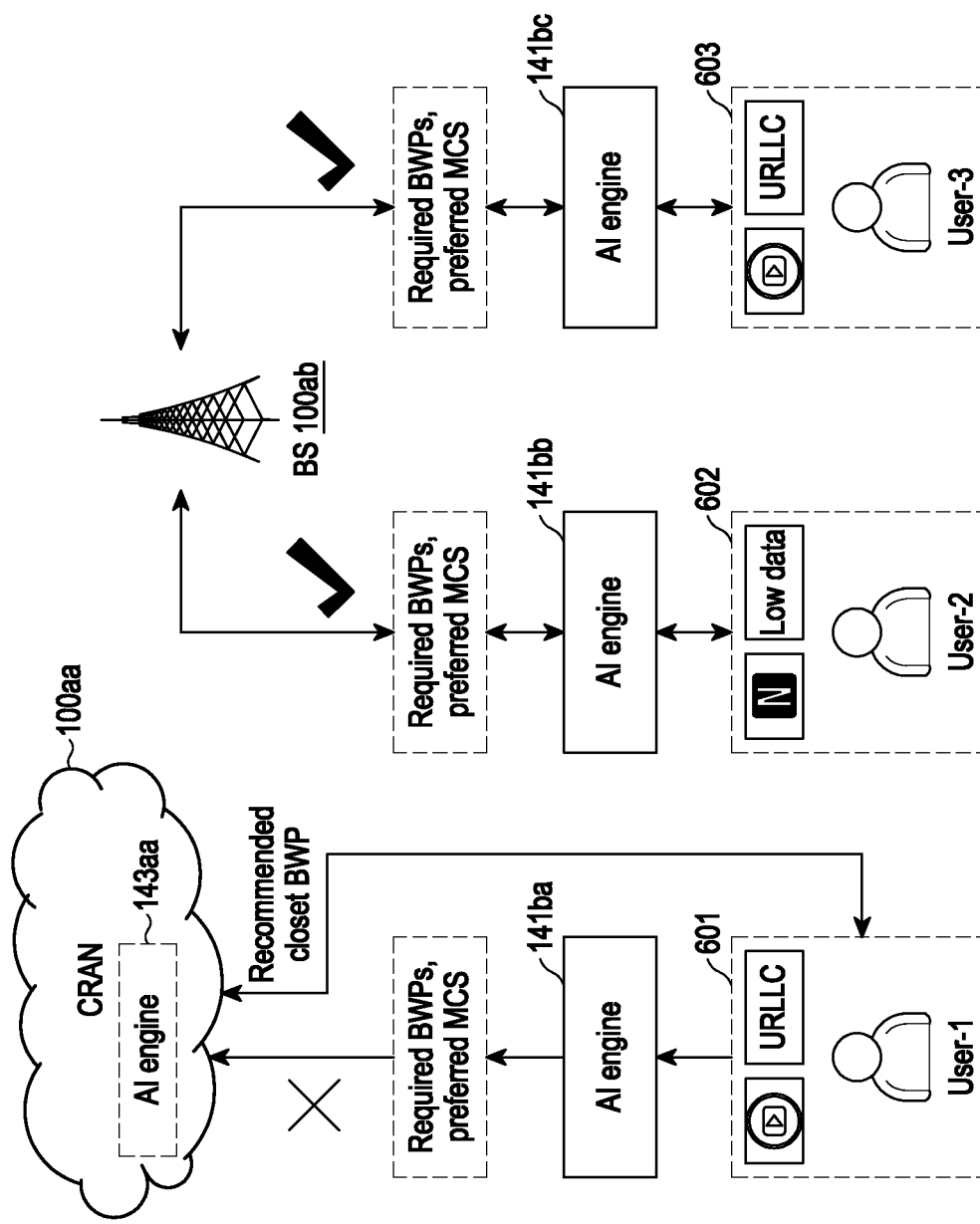
FIG. 6 is a diagram illustrating an example scenario for the bandwidth management in the wireless communication network, according to various embodiments.

FIG. 6 is a diagram illustrating an example scenario for the bandwidth management in the wireless communication network, according to various embodiments.

In the example scenario, multiple users (601, 602, and 603) of the UEs (100b) utilizes various service (e.g., video application) of the application with varying QoS (e.g. low data, URLCC, etc.). The AI engine (141ba/141bb/141bc) of each UEs (100b) identifies the service of the application with varying QoS requirements and determines the first optimal BWP for the identified service for each UEs (100b). Furthermore, each UEs (100b) sends the message to the server (100a) (e.g. CRAN (100aa), the base station (BS) (100ab), etc.), where the message indicates the first optimal BWP for the identified service is required for each UEs (100b). The server (100a) then allocates the first optimal BWP for the identified service, if available at the server (100a), or allocates/recommends the second optimal BWP for the identified service.

In an embodiment, the server (100a) checks the availability of BWP or request from the UE (100b), then allocates resources accordingly. Furthermore, additional inputs to the AI engine (142a/141b) may require UE-specific inputs (like priority of service, location, and battery left), and information about the base station will also be used to find out the availability of the BWP.

In an embodiment, if the user of the UE (100b) wants to use multiple services and each of these services has different QoS requirements then the UE (100b) will allocate more than one BWP. In cases where the BWPs requested are not available then, the cycle continues e.g., the server (100a) informs that resources aren't available, and then the UE's NN (e.g., the AI engine (141b)) calculates another set of BWPs available.

In an embodiment, the disclosed method reduces the load on the server (100a) (e.g., RAN system) by offsetting a neural network part to the UE (100b). The BWP requirements are dependent on the UE (100b) only and hence, placing the neural network at the UE (100b) allows us to input more UE parameters to the AI engine (142a/141b). Further, the disclosed method increases data privacy as the UE's data is not shared with the RAN. Furthermore, the disclosed method can work on Game Processing Units (GPUs) provided in self-driving cars and an AI accelerator provided on mobile phones. If the UE (100b) doesn't have good processing hardware then the neural network calculation will increase latency. If the BWP requested by the UE (100b) is not available then, the calculation for a new BWP has to start from the beginning, this in turn increases latency.

In an embodiment, the recommendation engine (143a/142b) can be implemented using the neural network (e.g., AI engine (141b)). If the BWP requested by the UE (100b) is not available then the server (100a) (e.g., BS) will relay the information back to the UE (100b). Also, the BS will inform the UE (100b) about a closest available BWPs, calculated using the neural network at the server (100a) (e.g., BS or CRAN, or VRAN). The UE (100b) will acknowledge the allocated BWPs.

For example, the UE (100b) wants 3-BWPs for 3-different services with different QoS requirements, and then it calculated the suitable BWP using the neural network. The server (100a) (e.g., BS) doesn't have 2 of the 3 requested BWPs available, then the server (100a) can use its recommender system (e.g., recommendation engine (143a)) to recommend two new BW that are similar in characteristics (can support the QoS) to the UE (100b). AI-assisted fallback will reduce the time for deciding the BWP allocation. Easy BWP handling, if the BWP is not available then the nearest BWP can be found. Decreases latency and reduces the computational complexity of the system, as the UE (100b) is requesting more than one BWPs, but only some of the requested BWPs are not available, thus the server (100a) will be allocated the available BWPs to the UE (100b) but recommend new BWPs for the unavailable ones.

In an embodiment, the disclosed method, the server (100a) (e.g., BS/CRAN/VRAN) is equipped the neural network that allocates multiple BWPs according to the service requirement of the UE (100b). The UE (100b) sends the services-related requirements to the server (100a) like QoS. The server (100a) uses the neural network to calculate the BWP and MCS for each service. Having a centralized model increases the flexibility of BWP handling and BWP allocation. For example, if the server (100a) finds that some particular service is being used by many UEs (100b) then it can increase the BWP allocation for that particular service.

In an embodiment, in the disclosed method, the UE (100b) may request one or more than one BWP for its services (QoS), and the server (100a) has to check the availability of resources. Which is a typical resource optimization problem and can be modelled as a Markov Decision Process (MDP). The environment includes the UE (100b) and their service requirements, and the agent (e.g., the server (100a)) has to decide on BWP switching. A reward mechanism will be based on optimizing both the UE (100b) and the server (100a) performance (reduction in latency, better decoding, etc.). Using the reward mechanism as a reinforcement mechanism, the server (100a) learns a policy e.g., what actions to take when for a particular environment. The action involves BWP handling.

In an embodiment, for multiple BWP allocation, the AI engine (142a/141b) can be implemented using reinforcement learning/mechanism, which in turn uses neural networks. The AI engine (142a/141b) can be implemented in a flexible manner and can use various cost functions in training. Different cost functions can give the AI engine (142a/141b) corresponding to different external factors. Thus can develop different AI engines (142a/141b) to react to changes in different external conditions.

In an embodiment, the disclosed method optimizes the resource allocation mechanism and reduces a BLER rate intelligently, the UE (100b) experiences lesser latency. Furthermore, the disclosed method simplifies a system design and complexity. Furthermore, a power efficiency of the UE (100b) can be improved and lesser latency is used. Furthermore, the QoS of the user will be better, and better spectrum management at the server (100a).

In an embodiment, the server (100a) selects the MCS based on a Channel Quality Indicator (CQI) reported by the UE (100b). A transmission is made with the selected MCS and the results of the transmission are converted by the server (100a) into rewards that the server (100a) uses to learn the suitable mapping from the CQI to the MCS. Compared with a conventional fixed look-up table and an outer loop link adaptation, the disclosed method achieves superior performance in terms of spectral efficiency and the BLER. Furthermore, the disclosed method enables the BS (e.g., the server (100a)) to choose a suitable modulation and coding scheme (MCS) that maximizes and/or improves the spectral efficiency while maintaining a low block error rate (BLER), based on the Q-learning mechanism. The disclosed method selects an appropriate modulation and coding scheme (MCS), as a function of the channel quality, to keep the BLER below a predefined threshold. In the 4G long-term evolution (LTE) system, the BLER target is fixed at 10%. However, the 5G systems will cover a wider spectrum of services, requiring potentially different BLER targets. Furthermore, the disclosed method provides an online learning framework that enables the BS (e.g., the server (100a)) to choose a suitable MCS that maximizes and/or improves the spectral efficiency. The BS (e.g., the server (100a)) decides a specific MCS at a certain time instant. The UE (100b) measures the reward of that action and reports it to the BS (e.g., the server (100a)).

In an embodiment, each UE (100b) has a separate neural network to recommend the BWP and MCS required. The UE (100b) informs a Distribution Unit (DU) through MAC CE about a new BWP and MCS required. The MAC can re-compute the applicable BWP and inform the DU for triggering the RRC Signalling. The DU can inform a Central Unit (CU) via UE Context Modification Required message. The CU can perform RRC Reconfiguration Message to UE to signaling the new BWP configuration for the slice.

In an embodiment, the disclosed method implements as a micro service-based application, for example, in RAN Intelligent Controller (RIC) Platform. Each UE (100b) has a separate neural network to recommend the BWP and MCS required. The UE (100b) informs the DU through MAC CE about the new BWP and MCS required. The DU can feed the RIC/ML mechanism (e.g. AI engine) with the required mechanism inputs through an E2 Interface (E2AP RIC Indication Message). The AI engine (142a/141b) takes care of "near Real-time" delay while considering the outcome of the neural network. RIC/xAPP can inform the CU to trigger the RRC Reconfiguration for adapting the new BWP through the E2 Interface. A new E2 Service Model (E2SM) message type and content designed for sending the ML inputs to RIC xAPP and for intimating the CU for RRC Signalling.

In an embodiment, the disclosed method provides a flexible BWP and MCS/BWP based on a UE active profile and based on the ML/AI engine (142a/141b). The distributed neural network per UE to recommend the BWP and MCS based on several factors including the UE specific inputs (like priority of service, location, battery left) and information about the base station will also be used to find out the availability of the BWP. Furthermore, flexible BWP/MCS allocated by the AI engine (142a/141b) can be implemented using reinforcement learning, which in turn uses neural networks. The AI engine (142a/141b) can be implemented in a flexible manner. Furthermore, the centralized BS/CRAN/VRAN (e.g., the server (100a)) is equipped with the neural network (e.g., AI engine (142a)) that allocates multiple BWPs according to the service requirement of the UEs. Using MAC elements, the server (100a)/the UE (100b) can transmit/convey the active BWP(s) details periodically or aperiodically. Based on the LCG(s)/QCI(s) data, the server (100a)/the UE (100b) will transmit the data. Using the PDCCH, the server (100a)/the UE (100b) can transmit/covey the active BWP(s) details periodically or aperiodically. Based on the LCG(s)/QCI(s) data, the BS/UE will transmit the data. Using the broadcast or any control messages, the BS/UE can convey the active BWP(s) details periodically or aperiodically. Based on the LCG(s)/QCI(s) data, the BS/UE will transmit the data. The disclosed method is applicable for both Time Division Duplexing (TDD)/Frequency-Division Duplexing (FDD) systems.

The embodiments disclosed herein can be implemented using at least one hardware device and performing network management functions to control the elements.

The foregoing description of the various example embodiments is such that others, skilled in the art, can, by applying current knowledge, readily modify and/or adapt for various applications such embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein. It will also be understood that any of the embodiment(s) described herein may be used in conjunction with any other embodiment(s) described herein.

What is claimed is:

1. A method performed by a server for bandwidth management in a wireless communication network, the method comprising:
    receiving a plurality of data packets from at least one network device for transmission to a user equipment (UE);
    determining a plurality of network parameters, at least one of the plurality of network parameters being associated with the at least one network device, at least one of the plurality of network parameters being associated with the UE, and at least one of the plurality of network parameters being associated with the plurality of received data packets, wherein the plurality of network parameters comprise a total available bandwidth at the base station, a required load condition of the UE, an active profile of the UE, and a category of the UE;
    grouping the plurality of received data packets into a plurality of groups of data packets based on the plurality of network parameters;
    allocating at least one bandwidth part (BWP) and at least one sub-carrier spacing to each group of the plurality of groups of data packets based on the plurality of network parameters; and
    sending, to the UE, each group of the plurality of groups of data packets using the corresponding at least one allocated BWP and the corresponding at least one allocated subcarrier spacing.

2. The method of claim 1, wherein sending each group of the plurality of groups of data packets comprises:
    scheduling a transmission of one of the plurality of groups of data packets over the corresponding at least one allocated BWP and the corresponding at least one allocated subcarrier spacing;
    dynamically switching the corresponding at least one allocated BWP and the corresponding at least one allocated subcarrier spacing based on the plurality of network parameters; and
    sending the scheduled data packets to the UE.

3. The method of claim 1, wherein the plurality of network parameters further comprises at least one of quality of service (QOS) parameters of the plurality of received data packets, a status of a base station, a user-specific input, an active profile of the UE, a service type, a requirement of block error rate (BLER), a packet loss tolerance, a UE category, a QoS class identifier (QCI) load status, a coherence time, and a coherence bandwidth.

4. The method of claim 1, wherein grouping the plurality of received data packets based on the plurality of network parameters comprises:
    receiving over time the plurality of network parameters;
    generating an artificial intelligence (AI) engine using the plurality of network parameters and a time, wherein the AI engine is trained using Reinforcement Learning; and
    grouping the plurality of received data packets using the AI engine.

5. The method of claim 2, wherein dynamically switching the at least one allocated BWP based on the plurality of network parameters to send the scheduled data packets to the UE comprises:
    sending the scheduled data packets to the UE using a first active BWP of the at least one BWP;
    detecting a change in the plurality of network parameters, wherein the server requires a second active BWP of the at least one BWP to send the scheduled data packets to the UE;
    sending active BWP change information to the UE; and
    dynamically switching from the first active BWP to the second active BWP upon sending the active BWP change information to send the scheduled data packets to the UE.

6. The method as claimed in claim 5, wherein the active BWP change information is sent using at least one of a medium access control (MAC) element, a radio resource control (RRC) signalling, a physical downlink channel, a broadcast message and a control message, wherein the active BWP change information is sent to the UE using at least one of a periodic transmission and aperiodic transmission.

7. The method of claim 2, wherein dynamically switching the at least one allocated BWP based on the plurality of network parameters to send the scheduled data packets to the UE comprises:

sending the scheduled data packets to the UE using a first active BWP of the at least one BWP;
detecting a change in the plurality of network parameters, wherein the server requires a second active BWP of the at least one BWP to send the scheduled data packets to the UE;
sending additional BWP change information to the UE;
simultaneously sending, by the server, the scheduled data packets to the UE using the first active BWP and the second active BWP;
detecting a change in the plurality of network parameters, wherein the server requires the first active BWP of the at least one BWP to send the scheduled data packets to the UE;
sending deactivation of the BWP change information to the UE; and
dynamically switching to the first active BWP upon sending the deactivation of the BWP change information to send the scheduled data packets to the UE.

8. The method of claim 2, wherein dynamically switching the at least one allocated subcarrier spacing based on the plurality of network parameters to send the scheduled data packets to the UE comprises:
sending the scheduled data packets to the UE using a first active BWP of the BWP with a first sub-carrier spacing;
detecting a change in the plurality of network parameters, wherein the server requires a second sub-carrier spacing for the first active BWP to send the scheduled data packets to the UE;
sending BWP sub-carrier spacing change information to the UE; and
dynamically switching from the first subcarrier spacing to the second sub-carrier spacing upon sending the BWP sub-carrier spacing change information to send the scheduled data packets to the UE.

9. The method of claim 1, the method further comprising:
receiving a message from the UE, wherein the message indicates a first BWP for at least one identified service of at least one application with varying Quality of Service (QOS) is required at the UE; and
sending at least one of the first BWP for the at least one identified service and a second BWP from the server, wherein the second BWP sends to the UE based on the first BWP not being available at the server.

10. A server for bandwidth management in a wireless communication network, the server comprising:
at least one processor, comprising processing circuitry;
memory for storing instructions that, when executed by at least one processor individually or collectively, cause the server to:
receive a plurality of data packets from at least one network device for transmission to a user equipment (UE);
determine a plurality of network parameters, at least one of the plurality of network parameters being associated with the at least one network device, at least one of the plurality of network parameters being associated with the UE, and at least one of the plurality of network parameters being associated with the plurality of received data packets, wherein the plurality of network parameters comprise a total available bandwidth at the base station, a required load condition of the UE, an active profile of the UE, and a category of the UE;
group the plurality of received data packets into a plurality of groups of data packets based on the plurality of network parameters;
allocate at least one bandwidth part (BWP) and at least one sub-carrier spacing to each group of the plurality of groups of data packets based on the plurality of network parameters; and
send, to the UE, each group of the plurality of groups of data packets using the corresponding at least one allocated BWP and the corresponding at least one allocated subcarrier spacing.

11. The server of claim 10, wherein the instructions, when executed by the at least one processor individually or collectively, cause the server to:
schedule a transmission of one of the plurality of groups of data packets over the corresponding at least one allocated BWP and the corresponding at least one allocated subcarrier spacing;
dynamically switch the at least one allocated BWP and the at least one allocated subcarrier spacing based on the plurality of network parameters; and
send the scheduled data packets to the UE.

12. The server of claim 10, wherein the plurality of network parameters further comprises at least one of quality of service (QOS) parameters of the plurality of received data packets, a status of a base station, a user-specific input, a service type, a requirement of block error rate (BLER), a packet loss tolerance, a QoS class identifier (QCI) load status, a coherence time, and a coherence bandwidth.

13. The server of claim 10, wherein the instructions, when executed by the at least one processor individually or collecitvely, cause the server to:
receive over time the plurality of network parameters;
generate an Artificial Intelligence (AI) engine using the plurality of network parameters and a time, wherein the AI engine is trained using Reinforcement Learning; and
group the plurality of received data packets using the AI engine.

14. The server of claim 11, wherein the instructions, when executed by the at least one processor individually or collectively, cause the server to:
send the scheduled data packets to the UE using a first active BWP of the at least one BWP;
detect a change in the plurality of network parameters, wherein the server requires a second active BWP of the at least one BWP to send the scheduled data packets to the UE;
send active BWP change information to the UE; and
dynamically switch from the first active BWP to the second active BWP upon sending the active BWP change information to send the scheduled data packets to the UE.

15. The server of claim 14, wherein the active BWP change information is to be sent using at least one of a medium access control (MAC) element, a radio resource control (RRC) signalling, a physical downlink channel, a broadcast message and a control message, wherein the active BWP change information is to be sent to the UE using at least one of a periodic transmission and aperiodic transmission.

16. The server of claim 11, wherein the instructions, when executed by the at least one processor individually or collectively, cause the server to:
send the scheduled data packets to the UE using a first active BWP of the at least one BWP;
detect a change in the plurality of network parameters, wherein the server requires a second active BWP of the at least one BWP to send the scheduled data packets to the UE;
send additional BWP change information to the UE;

simultaneously send the scheduled data packets to the UE using the first active BWP and the second active BWP;

detect a change in the plurality of network parameters, wherein the server requires the first active BWP of the at least one BWP to send the scheduled data packets to the UE;

send deactivation of the BWP change information to the UE;

dynamically switch to the first active BWP upon sending the deactivation of the BWP change information to send the scheduled data packets to the UE.

17. The server of claim 11, wherein the instructions, when executed by the at least one processor individually or collectively, cause the server to:

send the scheduled data packets to the UE using a first active BWP of the at least one BWP with a first sub-carrier spacing;

detect a change in the plurality of network parameters, wherein the server requires a second sub-carrier spacing for the first active BWP to send the scheduled data packets to the UE;

send BWP sub-carrier spacing change information to the UE; and dynamically switch from the first subcarrier spacing to the second sub-carrier spacing upon sending the BWP sub-carrier spacing change information to send the scheduled data packets to the UE.

18. The server of claim 17, wherein the instructions that, when executed by the at least one processor individually or collectively, cause the server to:

receiving a message from the UE, wherein the message indicates a first BWP for at least one identified service of at least one application with varying Quality of Service (QoS) is required at the UE; and sending at least one of the first BWP for the at least one identified service and a second BWP from the server, wherein the second BWP sends to the UE based on the first BWP not being available at the server.

* * * * *